US012739643B2

(12) United States Patent
Sun et al.

(10) Patent No.: US 12,739,643 B2
(45) Date of Patent: Sep. 15, 2026

(54) FAKE BASE STATION DETECTION USING TEMPORAL GRAPH ANALYSIS AND ANOMALY DETECTION

(71) Applicant: Dell Products, L.P., Round Rock, TX (US)

(72) Inventors: Sheng Sun, Kanata (CA); Ibrahim Abu Alhaol, Nepean (CA); Gwenael Poitau, Montreal (CA); Ali Esswie, Calgary (CA); Morris Repeta, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 18/534,373

(22) Filed: Dec. 8, 2023

(65) Prior Publication Data

US 2025/0193676 A1 Jun. 12, 2025

(51) Int. Cl.
*H04W 24/10* (2009.01)
*H04B 17/336* (2015.01)
(Continued)

(52) U.S. Cl.
CPC ........ *H04W 12/122* (2021.01); *H04B 17/336* (2015.01); *H04L 43/04* (2013.01); *H04W 24/10* (2013.01)

(58) Field of Classification Search
CPC ............... H04W 12/122; H04W 24/10; H04W 36/0085; H04B 17/336; H04L 43/04
See application file for complete search history.

(56) References Cited

U.S. PATENT DOCUMENTS

2018/0070239 A1* 3/2018 Norrman ............... H04W 12/10
2020/0145859 A1* 5/2020 Nair ....................... H04W 24/10
2025/0126532 A1* 4/2025 Sheoran ................ H04W 36/08

FOREIGN PATENT DOCUMENTS

EP 3035740 A1 * 6/2016 ............ H04W 48/20
EP 4 002 903 5/2022

OTHER PUBLICATIONS

3GPP ("3rd Generation Partnership Project; Technical Specification Group Services and System Aspects Study on 5G Security Enhancement against False Base Stations (Release 17 )", 3GPP Standard; Technical Report; 3GPP TR 33.809, Aug. 31, 2020).*

(Continued)

*Primary Examiner* — Lakeram Jangbahadur
(74) *Attorney, Agent, or Firm* — Amin, Turocy & Watson, LLP

(57) ABSTRACT

Network computing equipment may receive one or more radio parameter measurement reports generated by one or more user equipment. A report may comprise radio parameter values measured by user equipment corresponding to signals transmitted by a radio access network node and time information corresponding to the report. The computing equipment may perform temporal analysis based on time information corresponding to one or more reports and may generate a temporal graph based on the time information. Edges of the temporal graph may correspond to connection activity of user equipment that generated the reports with respect to one or more radio access network nodes. The edges may be ranked using a graph-based model and optimally combined with anomaly scores, determined based on the measured radio parameter values, into combined anomaly scores that may be compared to a criterion to determine that a radio access network node is a fake base station.

20 Claims, 12 Drawing Sheets

(51) Int. Cl.
*H04L 43/04* (2022.01)
*H04W 12/122* (2021.01)

(56) References Cited

OTHER PUBLICATIONS

International Search Report and Written Opinion mailed Aug. 22, 2024 for PCT Application No. PCT/US2024/013744, 15 pages.
"3rd Generation Partnership Project; Technical Specification Group Services and System Aspects Study on 5G Security Enhancement against False Base Stations (Release 17 )", 3GPP Standard; Technical Report; 3GPP TR 33.809, No. V0.10.0, Aug. 2020, [ftp://ftp.3gpp.org/Specs/archive/33_se ries/33.809/338O9-0a0.zip S3-202150-TR33.809-v0.10.0-rm.docx] 88 pages.
Nakarmi, et al. "Applying Machine Learning on RSRP-Based Features for False Base Station Detection" 17th International Conference on Availability, Reliability and Security (ARES 2022), Aug. 23-26, 2022, Vienna, Austria. arXiv:2207.10999v1 [cs.CR] Jul. 22, 2022. 9 pages.
Notification Concerning Transmittal of Copy of International Preliminary Report on Patentability mailed Jun. 18, 2026 for PCT Application No. PCT/US2024/013744, 8 pages.
European Office Action mailed Jul. 15, 2026 for European Patent Application No. 24708646.5, 3 pages.

* cited by examiner 100
110
110
110
110
115
115
115
115
117
105
105
105
120
120
120
125
125
125
125
125
135
135
137
CORE NETWORK 130
INTERNET SERVICES 150
140
145
145

205

Figure 7:
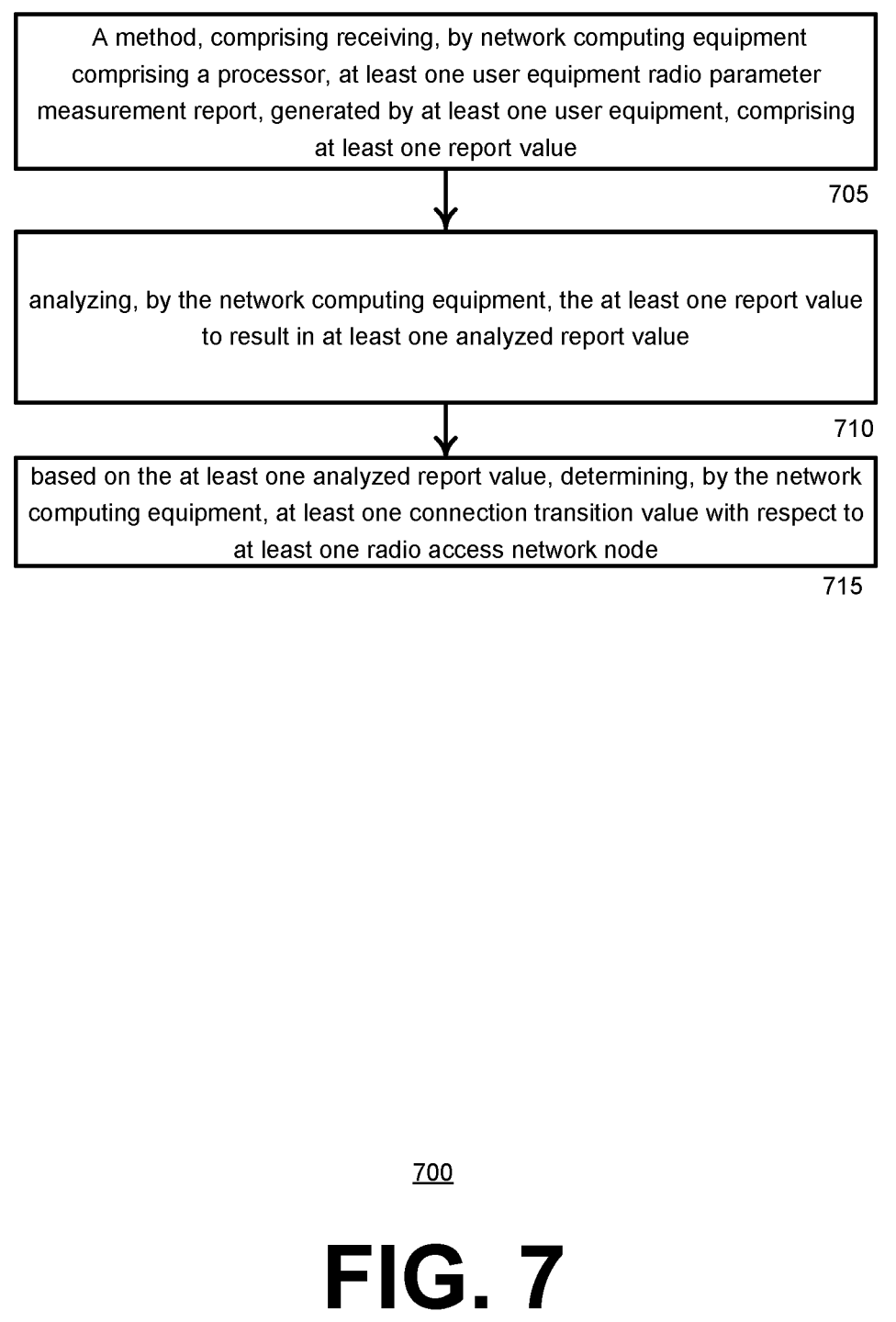

A method, comprising receiving, by network computing equipment comprising a processor, at least one user equipment radio parameter measurement report, generated by at least one user equipment, comprising at least one report value

705 analyzing, by the network computing equipment, the at least one report value to result in at least one analyzed report value

710 based on the at least one analyzed report value, determining, by the network computing equipment, at least one connection transition value with respect to at least one radio access network node

Figure 8:
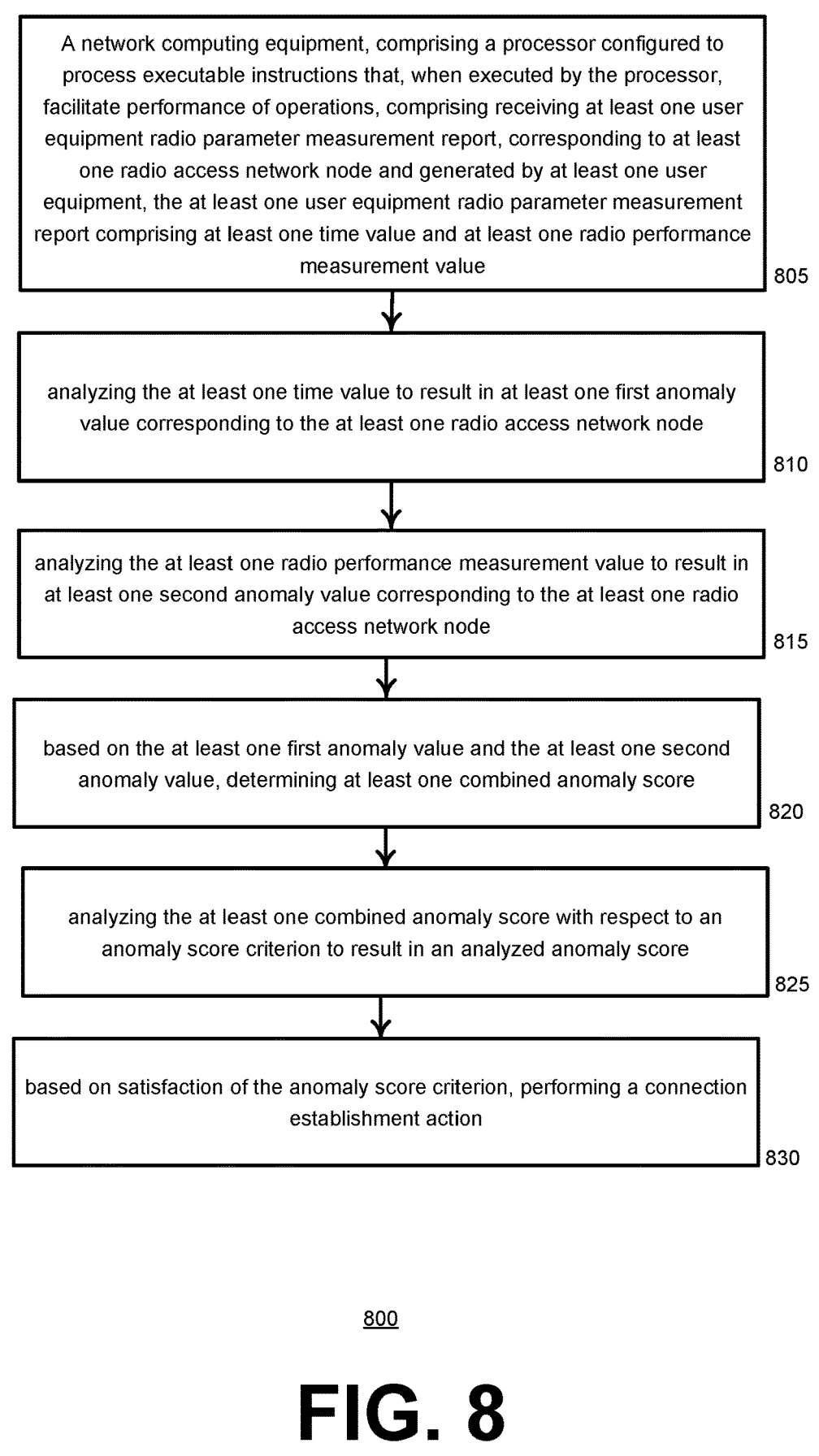

A network computing equipment, comprising a processor configured to process executable instructions that, when executed by the processor, facilitate performance of operations, comprising receiving at least one user equipment radio parameter measurement report, corresponding to at least one radio access network node and generated by at least one user equipment, the at least one user equipment radio parameter measurement report comprising at least one time value and at least one radio performance measurement value

805 analyzing the at least one time value to result in at least one first anomaly value corresponding to the at least one radio access network node

810 analyzing the at least one radio performance measurement value to result in at least one second anomaly value corresponding to the at least one radio access network node

815 based on the at least one first anomaly value and the at least one second anomaly value, determining at least one combined anomaly score

820 analyzing the at least one combined anomaly score with respect to an anomaly score criterion to result in an analyzed anomaly score

825 based on satisfaction of the anomaly score criterion, performing a connection establishment action

Figure 9:
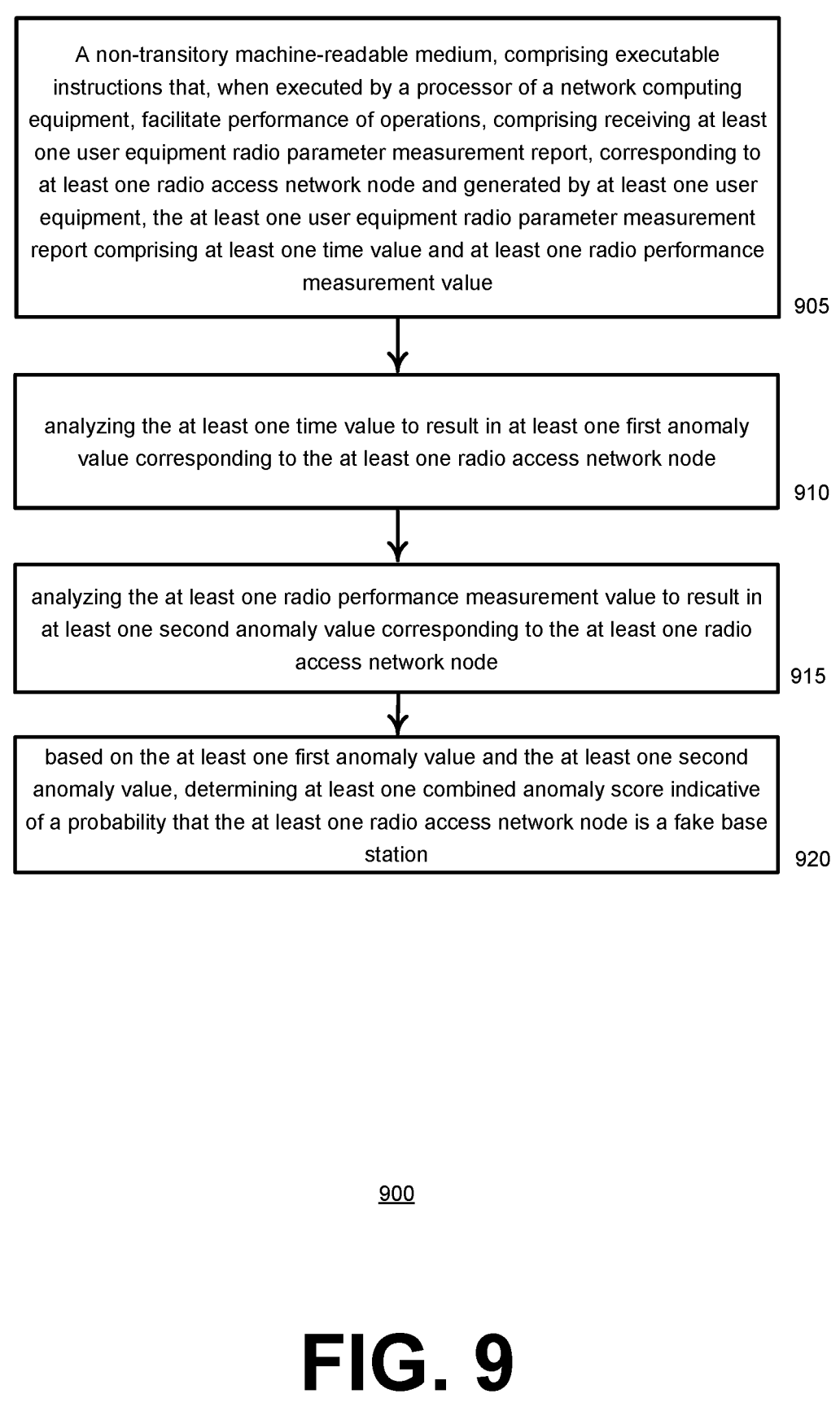

A non-transitory machine-readable medium, comprising executable instructions that, when executed by a processor of a network computing equipment, facilitate performance of operations, comprising receiving at least one user equipment radio parameter measurement report, corresponding to at least one radio access network node and generated by at least one user equipment, the at least one user equipment radio parameter measurement report comprising at least one time value and at least one radio performance measurement value

905 analyzing the at least one time value to result in at least one first anomaly value corresponding to the at least one radio access network node

910 analyzing the at least one radio performance measurement value to result in at least one second anomaly value corresponding to the at least one radio access network node

915 based on the at least one first anomaly value and the at least one second anomaly value, determining at least one combined anomaly score indicative of a probability that the at least one radio access network node is a fake base station

1160
TRANSCEIVER
1162
1ST
PROCESSOR
1130
MEMORY
1134
2ND
PROCESSOR
1132
SIM/
PROFILE(S)
1164
OUTPUT
DEVICE(S)
1168
SENSOR(S)
1166

FAKE BASE STATION DETECTION USING TEMPORAL GRAPH ANALYSIS AND ANOMALY DETECTION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Nefarious actors may deploy wireless devices that pose as base stations that are part of a legitimate mobile network operator's network (e.g., a Public Land mobile Network ("PLMN")), but in fact are not legitimate parts of a mobile network operator's network. The illegitimate devices may seek to attract a user equipment to attempt to connect to the devices to obtain personal information of a user of the user equipment attempting to connect to the illegitimate devices, or to obtain information corresponding to a mobile network operator, such as security credentials. An illegitimate device posing as a legitimate base station (e.g., posing as a legitimate RAN node) may be referred to as a fake base station, a false base station, or a fake RAN node. Other terminology that may refer to a fake base station may include 'an IMSI-catcher,' a 'cellular phone surveillance device,' 'rogue base station,' or 'cell site simulator.'

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by network computing equipment comprising a processor, at least one user equipment radio parameter measurement report, generated by at least one user equipment, comprising at least one report value and analyzing, by the network computing equipment, the at least one report value to result in at least one analyzed report value. Based on the at least one analyzed report value, the method may further comprise determining, by the network computing equipment, at least one connection transition value with respect to at least one radio access network node.

The at least one analyzed report value may correspond to at least one interval associated with the at least one user equipment radio parameter measurement report. An interval may be an interval between times corresponding to generation of measurement reports. An interval may be a configured period for which temporal analysis may be performed on times corresponding to the at least one user equipment radio parameter measurement report. The at least one analyzed report value may be at least one time-based value. The at least one time-based value may be a timestamp.

In an embodiment, the at least one radio access network node may be a first radio access network node. The at least one connection transition value may be a first connection transition value that corresponds to the at least one user equipment transitioning from having a connection status with the first radio access network node to having the connection status with a second radio access network node. The at least one user equipment radio parameter measurement report may be a first user equipment radio parameter measurement report. The at least one report value may be a first time corresponding to the at least one user equipment radio parameter measurement report. The first connection transition value may be determined based on at least the first time and a second time corresponding to a second user equipment radio parameter measurement report.

In an embodiment, the method may further comprise determining, by the network computing equipment, a second connection transition value based on at least the first connection transition value and a third time corresponding to a third user equipment radio parameter measurement report.

In an embodiment, the at least one radio access network node may be a first radio access network node and the at least one connection transition value may correspond to the at least one user equipment being idle and transitioning from selection of camping on the first radio access network node to selection of camping on a second radio access network node.

In an embodiment, the at least one radio access network node may be a first radio access network node and the at least one connection transition value may correspond to the at least one user equipment transitioning from being connected to the first radio access network node to being connected to a second radio access network node.

In an embodiment, the at least one connection transition value may be a first connection transition value corresponding to a time associated with the at least one user equipment radio parameter measurement report. The at least one user equipment radio parameter measurement report may further comprise at least one radio performance measurement value. The method may further comprise analyzing, by the network computing equipment, the at least one radio performance measurement value to result in a second connection transition value associated with the at least one radio access network node. Based on the first connection transition value and the second connection transition value, the method may further comprise determining, by the network computing equipment, a fake base station score indicative of a probability that the at least one radio access network node is a fake base station.

The method may further comprise analyzing, by the network computing equipment, the fake base station score with respect to a fake base station likelihood score criterion to result in an analyzed fake base station score. Based on the analyzed fake base station score being determined to satisfy the fake base station likelihood score criterion, the method may further comprise determining, by the network computing equipment, that the at least one radio access network node is at least one fake base station and the method may further comprise performing, by the network computing equipment, a connection establishment action. The connection establishment action may comprise adding at least one identifier corresponding to the at least one fake base station to a base station barring list.

In an embodiment, the analyzing of the at least one radio performance measurement value may comprise analyzing the at least one radio performance measurement value according to at least one of: an isolation forest machine learning model or a local outlier feature machine learning model.

In an embodiment, the at least one radio performance measurement value may be at least one of: a received signal strength value or a received signal signal-to-interference-plus-noise ratio value.

In an embodiment, the at least one connection transition value may be, may correspond to, or may be indicative of, a temporal graph edge, which may be indicative of connection activity of the at least one user equipment with respect to the at least one radio access network node.

In another example embodiment, a network computing equipment may comprise a processor configured to process executable instructions that, when executed by the processor, facilitate performance of operations, comprising receiving at least one user equipment radio parameter measurement report, corresponding to at least one radio access network node and generated by at least one user equipment, the at least one user equipment radio parameter measurement report comprising at least one time value and at least one radio performance measurement value. The operations may further comprise analyzing the at least one time value to result in at least one first anomaly value, or score, corresponding to the at least one radio access network node and analyzing the at least one radio performance measurement value to result in at least one second anomaly value, or score, corresponding to the at least one radio access network node. Based on the at least one first anomaly value and the at least one second anomaly value, the operations may further comprise determining at least one combined anomaly score and analyzing the at least one combined anomaly score with respect to an anomaly score criterion to result in an analyzed anomaly score. Based on satisfaction of the anomaly score criterion, the operations may further comprise performing a connection establishment action. A connection establishment action may comprise adding at least one identifier associated with the at least one radio access network node corresponding to the at least one combined anomaly score to a barred base station list, notifying the at least one user equipment that the at least one radio access network node is likely a fake base station, or notifying a radio access network node other than the at least one radio access network node that the at least one radio access network node corresponding to the at least one analyzed combined anomaly score that satisfies the anomaly score criterion is likely a fake base station.

In an embodiment, the determining of the at least one combined anomaly score may comprise applying an ensemble learning model to the at least one first anomaly value and the at least one second anomaly value. In an embodiment, the analyzing of the at least one radio performance measurement value may comprise applying, to the at least one radio performance measurement value, at least one of: an isolation forest learning model or a local outlier factor learning model. In an embodiment, the analyzing of the at least one time value may comprise applying a temporal graph model to the at least one time value and wherein the at least one first anomaly value is at least one temporal graph edge. The at least one time value may be a time stamp corresponding to the at least one user equipment radio parameter measurement report. The time value may comprise a mean or a standard deviation value determined based on a time stamp corresponding to the at least one user equipment radio parameter measurement report. In an embodiment, the network computing equipment may be part of, or a component of, a wireless communication network core network.

In yet another example embodiment, a non-transitory machine-readable medium may comprise executable instructions that, when executed by a processor of a network computing equipment, facilitate performance of operations comprising receiving at least one user equipment radio parameter measurement report, corresponding to at least one radio access network node and generated by at least one user equipment. The at least one user equipment radio parameter measurement report may comprise at least one time value and at least one radio performance measurement value. The operations may further comprise analyzing the at least one time value to result in at least one first anomaly value, or score, corresponding to the at least one radio access network node and analyzing the at least one radio performance measurement value to result in at least one second anomaly value, or score, corresponding to the at least one radio access network node. Based on the at least one first anomaly value and the at least one second anomaly value, the operations may further comprise determining at least one combined anomaly score indicative of a probability that the at least one radio access network node is a fake base station.

In an embodiment, the analyzing of the at least one time value may comprise applying a temporal graph model to the at least one time value. The at least one first anomaly value may correspond to at least one edge of a temporal graph generated by the applying of the temporal graph model to the at least one time value. The at least one radio access network node may be a first radio access network node. The at least one edge may correspond to connection transition activity with respect to the first radio access network node and at least a second radio access network node. Connection transition activity may comprise selecting or reselecting the at least one radio access network node or a radio access network node that is a geographic neighbor to the at least one radio access network node. Connection transition activity may comprise handing over of the at least one user equipment to at least one radio access network node that is a geographic neighbor to the at least one radio access network node.

BRIEF DESCRIPTION OF THE DRAWINGS

FIG. 7 illustrates a block diagram of an example method.

FIG. 8 illustrates a block diagram of an example network computing equipment.

FIG. 9 illustrates a block diagram of an example non-transitory machine-readable medium.

DETAILED DESCRIPTION OF THE DRAWINGS

Figure 1:
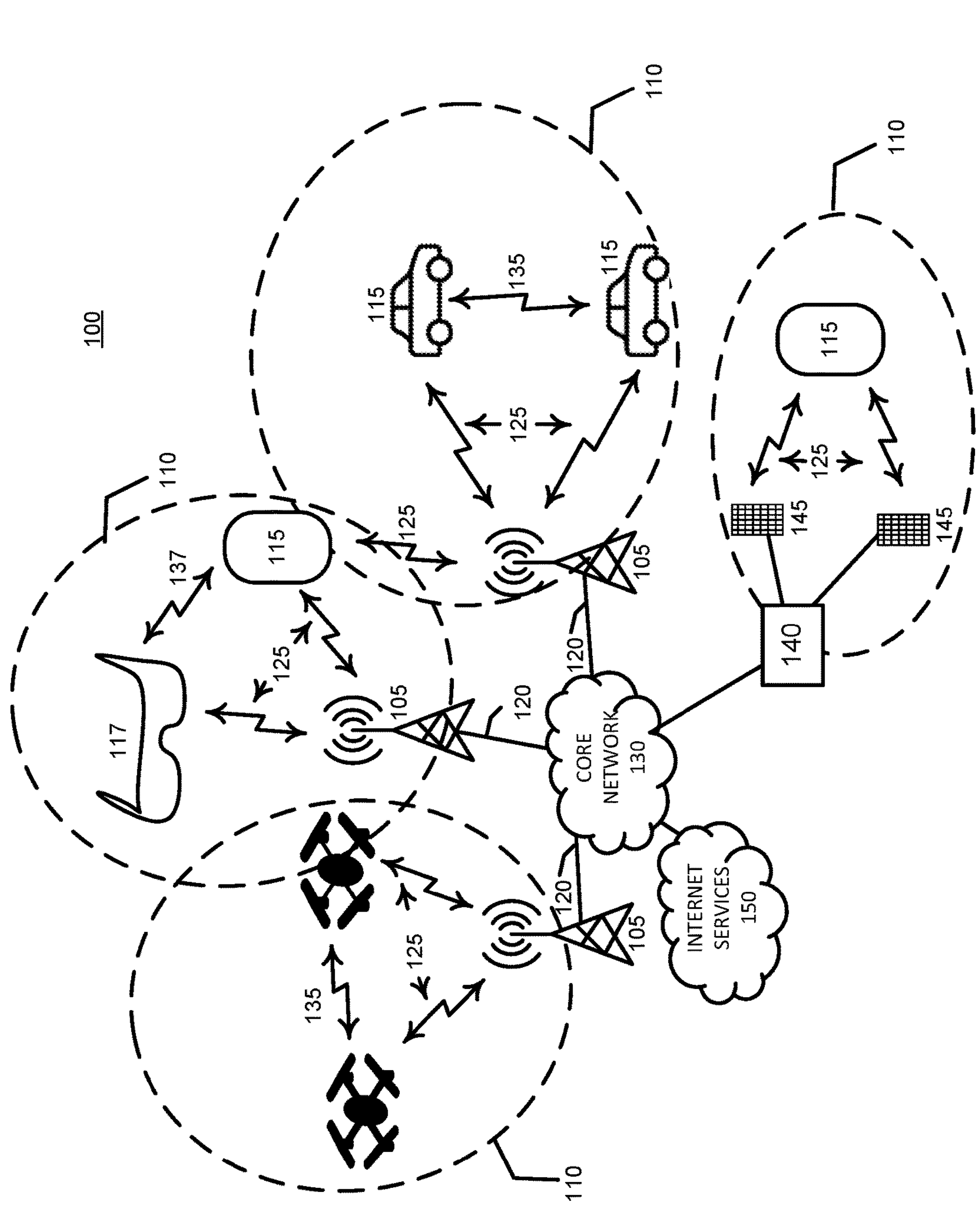
FIG. 1 illustrates a wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning model's ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions. A network computing device, which may be a component of a 5G core network, may operate one or more AI/ML models that perform various functions, including determining the presence and operation of a fake base station.

A network RAN, or core network computing equipment, can dynamically control activation, deactivation, triggering of model retraining (that may be radio-function-specific), or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Fake base-station ("FBS") deployments are considered a security risk of and to current cellular wireless communication systems. A typical FBS deployment may be implemented by a non-legitimate and low-capability base station (e.g., low processing power and low sophistication) within a signal coverage range of a legitimate cellular network node, with the objective of either collecting user equipment device information or installing harmful software on user equipment. For example, a vehicle-mounted moving FBS can deceive idle mode user equipment devices by appearing to the user equipment as a legitimate RAN node to be selected/re-selected, because the user equipment is likely to receive much better coverage levels (e.g., signal strength) from a very nearby FBS than from a farther away legitimate RAN node, thus misleading idle mode user equipment devices to select/re-select the FBS instead of available legitimate RAN nodes. Upon detecting a present FBS within a certain coverage of the legitimate network, current FBS prevention measures comprise manual intervention, wherein the FBS (and its mounting vehicle) are detected manually with radio scanners. Conventional techniques do not support dynamic FBS access prevention (e.g., avoiding a node based on determining in real time that a node is an active FBS). Using conventional techniques typically results in costly, slow, and unreliable FBS operation prevention.

A fake base station may emulate legitimate cellular network operation which may facilitate different types of attacks, such as the identity theft, scamming text messages, fraud web sites, eavesdropping, intercepting calls, denial-of-service attacks, spreading of malware, stealing of users' bank account information via phishing messages, etc. Due to the low cost and case of deployment of Software Defined Radios ("SDR"), the incidents and security breaches caused by fake base stations have risen in recent years, including targeting troops in the field of battle. Conventional detection methods are usually operated through manual inspection with scanning tools, and analysis of radio signals. Conventional detection techniques often fail in accurately identifying fake base stations and often result in substantial false positive indications of fake base stations. Fake base stations may employ detection evasion techniques, such as intermittently turning off radio transceivers or moving to another location. Embodiments disclosed herein may use one or more AI/ML models that combine Temporal Graph analysis and anomaly detection models to enhance fake base station detection accuracy. Embodiments disclosed herein may use an ensemble model to evaluate outputs of a Temporal Graph model, an Isolation Forest model, and a Local Outlier Factors model. The Temporal Graph model may analyze temporal characteristics corresponding to one or more user equipment connectivity or hand-off events. An Isolation Forest model ("IF") or a Local Outlier Factor ("LOF") model may analyze radio parameter measurements to result in anomaly determination. The temporal characteristics analyzed by the temporal graph model and the radio parameter measurement values analyzed by the IF and LOF may be obtained via radio measurement reports regularly submitted by user equipment and that may be receive by core network computing equipment. Radio measurement reports that are typically generated regularly by user equipment and transmitted to one or more radio access network node may be referred to as user equipment radio parameter measurement reports. Information contained in a user equipment radio parameter measurement report may be analyzed by network computing equipment to determine a likelihood that a radio access network node is a fake base station posing as a legitimate radio access network node.

Using embodiments disclosed herein, network computing equipment determines that a radio access network node is a fake base station with high accuracy even when a fake base station utilizes sophisticated detection evasion techniques. Embodiments disclosed herein may combine temporal analysis techniques and graph-based analysis techniques with analysis of radio features/radio performance parameter values corresponding to radio parameters such as, for example, received signal strength indication (e.g., Reference Signal Received Power ("RSRP")) or a signal-to-interference-plus-noise-ratio value ("SINR"), based on time information or radio performance parameter information that may be included in user equipment radio parameter measurement reports transmitted by user equipment located within a signal coverage area corresponding to one or more radio access network node indicated in the user equipment radio parameter measurement reports. Temporal Graph analysis facilitates analyzing connection and disconnection events, or handoff events, with respect to one or more user equipment and one or more radio access network node. A probabilistic detection model, such as PageRank model, may facilitate analyzing results of temporal graph analysis to obtain anomaly scores or anomaly values corresponding to one or more transition(s) from one RAN node to another RAN node during a configured sampling period. A temporal graph model may facilitate accurate analysis of connection popularity in a given wireless network geographic coverage area. Connection popularity may refer to one or more RAN nodes to which or from which one or more user equipment is/are handed to/from or to which or from which one or more user equipment select or reselect while in an idle or standby mode. Embodiments disclosed herein may comprise pre-trained learning models. Embodiments disclosed herein may facilitate identifying one or more legitimate RAN nodes/base stations that are impacted by one or more fake base stations that may be operational within a wireless signal coverage range of the legitimate RAN node by using information resulting from implementation of the embodiments.

Regular user equipment radio parameter measurement reports are generated and transmitted by user equipment in wireless network system, including 5G. Thus, embodiments disclosed herein do not impose substantial, if any, processing or battery loading on a user equipment. Typically, a user equipment radio parameter measurement report is transported when a user equipment is in an idle mode/state, a standby mode/state, or in a connected mode/state. Idle mode measurement is typically used to facilitate cell/RAN node selection or reselection and is typically based on measurements made by user equipment with respect to System Information Block ("SIB") message signals. Connected mode measurement(s) is/are typically used to facilitate handover from one RAN node to another RAN node and measured values are typically determined based on RRC message signals directed to a specific UE.

A typical fake base station may be facilitated by consumer-grade SDRs, which may result in poor SINR and RSRP measurement(s) by a user equipment depending on various factors. A factor that may cause poor SINR or poor RSRP measurement values by a user equipment may include low-quality equipment compared to legitimate base stations that result in weaker signal transmission and higher noise levels. Another factor that may cause poor SINR or poor RSRP measurement values by a user equipment may include interference with nearby legitimate RAN nodes due to a fake base station being unauthorized and thus not being coordinated with legitimate base stations, which interference can result in poor SINR measurements determined by user equipment that are selecting or connecting to, or that have selected or connected to, the fake base station.

A fake base station may typically be placed amidst targeted user equipment and may be concealed to avoid detection. A fake base station may implement various detection evasion techniques to avoid manual detection, which typically implements sophisticated radio scanners. Detection evasion techniques typically attempt to blend in a fake base station with legitimate base stations to increase difficulty in detection by the sophisticated radio scanners employed by manual detection methods. A common detection evasion technique involves randomly turning a fake base station on and off. Another detection evasion technique may involve moving a fake base station mounted on, to, or in a vehicle (e.g., a cargo van) to different locations, thus causing an increased difficulty in tracking and locating a fake base station. Another detection evasion technique involves changing a Cell identifier corresponding to a fake base station to make the fake base station appear to a user equipment as a new base station.

Detection evasion techniques can confuse network monitoring systems and hinder detection. Conventional AI/ML model fake base station detection techniques tend to overlook, or fail to detect, fake base stations implementing detection evasion techniques. Furthermore, conventional fake base station detection techniques may lead to false negatives, which means that a detection technique failed to identify a fake base station, or false positives, which means that a detection technique erroneously identifiers a legitimate base station as a fake base station.

Embodiments disclosed herein may facilitate detecting fake base stations using at least two layers of machine learning models to detect the radio feature anomalies and connectivity behavior anomalies based on analysis of information contained in, or corresponding to, user equipment radio parameter measurement reports. Embodiments disclosed herein may use an Isolation Forest anomaly detection learning model or a Local Outlier Factor anomaly detection learning mode to analyze the radio signal features, or measured radio parameter values, such as RSRP and SINR, to identify RAN nodes that may be fake base stations. A probabilistic detection model, such as a pagerank learning model, may facilitate determining user equipment connectivity behaviors, demonstrated over time, with different base stations. Each model layer may provide an anomaly score. A normalized composite, or combined, fake base station probability may be calculated using the anomaly scores corresponding to radio access network nodes. Embodiments disclosed herein may facilitate determining with increased accuracy, with respect to conventional techniques, identification of the fake base stations with a significantly reduction of false positives.

Figure 6:
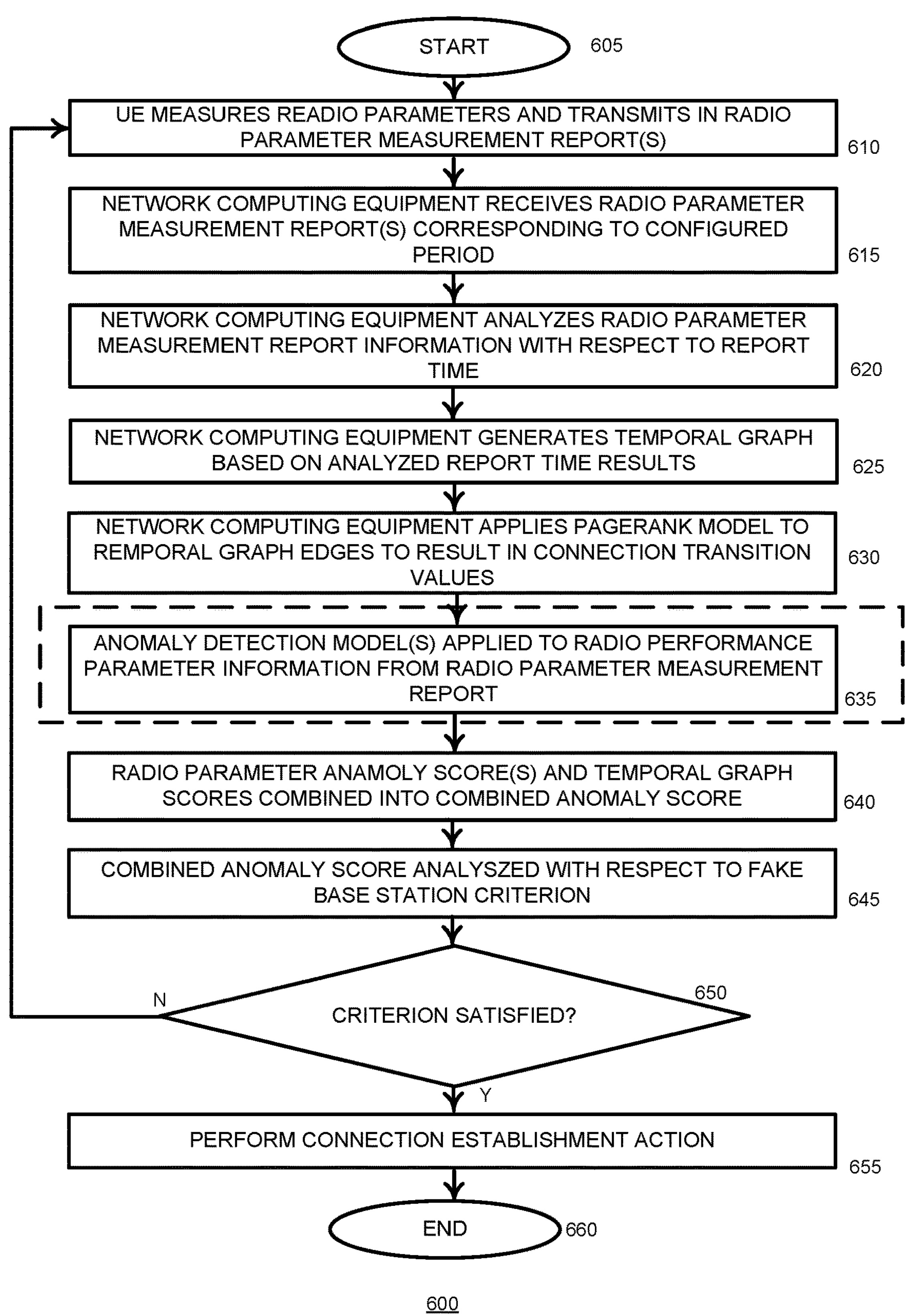
FIG. 6 illustrates a flow diagram of an example method to determine that a node is a fake base station.

In an example embodiment method described in more detail in reference to FIG. 6, feature information contained in a user equipment radio parameter measurement report may be analyzed to determine a likelihood that a base station corresponding to one or more user equipment measurement reports is a fake base station. For example, one or more RSRP value(s) or one or more SINR value(s) contained in one or more user equipment radio parameter measurement reports may be analyzed to determine one or more anomalies corresponding to one or more radio access network node(s). These radio parameter values may be referred to as features with respect to analysis by a learning model and may be indicative of a RAN node's operation and performance. The example method may apply temporal analysis to information contained in one or more user equipment radio parameter measurement reports to determine a mean and standard deviation corresponding to time intervals between a UE's measurement reports with respect to a base station on which the user equipment is camped (e.g., the UE is in an idle mode or a standby mode) or to which the user equipment is connected (e.g., the user equipment is in a connected mode). Temporal analysis may facilitate examination of temporal patterns or identification of any peculiar temporal anomalies that may indicate the existence of fake base stations within a radio access network or that may correspond to fake base station detection evasion techniques.

An ensemble anomaly detection model may receive output from a probabilistic detection model, such as a pagerank model, and from an IF model or from a LOF model. The IF model may isolate anomalies by randomly selecting a feature and then randomly selecting a split value between the maximum and minimum values of the selected feature, is particularly useful in anomaly detection for high-dimensional datasets. The LOF model may measure local deviation of density of a given sample, thus aiding in the identification of regions of similar density. The IF model may facilitate detection of anomalies in radio signals parameters/metrics such as RSRP and SINR. The IF model may facilitate isolating rare and abnormal data points within a dataset to identify unusual signal strengths or interferences levels that may indicate network anomalies or security breaches. Likewise, the LOF may facilitate anomaly detection by evaluating local density deviations of data points within a dataset. A LOF model may be useful for detecting anomalies in complex, high-dimensional datasets, thus facilitating identification of unusual patterns or outliers with respect to wireless communication parameters/metrics. LOF may facilitate pinpointing regions where signal strengths or interference levels deviate significantly from normal, or baseline, signal strengths or interference levels.

A temporal graph learning model may generate a temporal graph wherein nodes represent radio access network node and wherein edges between the nodes correspond to connection activity with respect to the radio access network nodes represented by the graph nodes. For each node in the graph, a probabilistic detection model, such as a pagerank model, may be applied to respective edges to result in associated anomaly value(s) corresponding to at least one radio access network node at one end of an edge and another node at another end of the edge. An anomaly value that results from applying a pagerank model, or similar model, may be referred to as a connection transition value and may correspond to connection transition activity of one or more user equipment, which transmitted one or more user equipment radio parameter measurement report, such as selecting one of the nodes to camp on or being handed over from one node at the end of an edge to another node at another end of an edge. A connection transition value may be referred to as a probability score that may correspond to an unusually high number of connection transitions of a UE from one RAN node to another RAN node and thus a probability that one of the RAN nodes connected by the edge is a fake base station. Connection transition values are indicated as percentage values corresponding to edges in graph 500 illustrated in FIG. 5. Using a pagerank score helps in predicting behavior of network connectivity transition, or handoff of, user equipment and the respective base stations. For each radio access network node and the radio access network node's corresponding anomaly score, a combined anomaly score may be calculated based on anomaly scores generated by an IF model or an LOF model, or a connectivity probability/score generated by a pagerank model. A combined anomaly score may be normalized to a range between 0 and 1 and may be assigned as a fake base station probability corresponding to a given radio access network node.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 10.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHZ), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

5G NR Radio Resource Control ("RRC") signaling typically comprises a master information block ("MIB") message and System Information Block ("SIB") messages that may be used to facilitate, or that may be vulnerable to, FBS attacks. Multiple types, or versions, of SIB messages may be transmitted by a RAN during an RRC procedure with a UE that is attempting to establish a connection with the RAN. Different SIB types may be referred to by different numerical identifiers, for example, an SIB1 message, an SIB2 message, an SIB3 message, and so on. An MIB message or an SIB1 message may be referred to as, or may comprise what is referred to as, minimum system information. Other SIB messages may be used to transmit system information during RRC connection establishment.

An MIB may carry, or comprise, channel bandwidth information, PHICH configuration information; transmit power information, number of antenna information, and SIB scheduling information transmitted. An SIB may be transmitted via a downlink shared channel. A system information container ("SI") may comprise multiple SIBs. Different SI containers may be transmitted at different frequencies and with sub-frames. SIB messages may be transmitted via a broadcast control channel ("BCCH").

A fake base station is a device that may be operated for nefarious purposes and that may masquerade as a real cell base station/RAN node to tap into mobile communications, which may pose a risk to user equipment and communication networks, such as, for example, 4G, 5G, 6G, or other wireless network that may operate an Open Radio Access Network ("Open-RAN") platform or operating system. An FBS, also known as an International Mobile Subscriber Identity ("IMSI") catcher, is a threat to cellular wireless communication networks. Typical FBS implementation involves setting up a Software Defined Radio ("SDR") to broadcast fake cellular information or to masquerade as a legitimate cell tower/RAN node in an adjacent area. Conventional protection techniques focus on post-authentication protection, thus broadcast signalling is not protected or authenticated, and thus a wide range of attacks are potentially present. Conventional techniques used in 5G wireless networks may implement Subscription Permanent Identity and Concealed Identity ("SUPI/SUCI") to thwart IMSI catcher attacks.

Safeguarding against fake FBS poses unique problems to user equipment in idle mode, or standby mode. User equipment in idle mode or standby mode operate in a power-conservation-focused mode, which limits power and processor use and restricts the ability of the use equipment to execute complex tasks such as radio environment scanning or advanced cryptographic operations, thus reducing the ability to determine that a signal broadcast from a RAN node is coming from an FBS. Furthermore, the absence of continuous network monitoring and rare re-authentication make idle/standby mode user equipment devices more susceptible to FBS attacks than user equipment in an active or connected mode.

A RAN node may transmit barring configurations, which may comprise a list of barred RAN nodes, towards user equipment to be used thereby to avoid accessing the RAN nodes identified in the list, which may be useful during periods of node congestion wherein the node cannot accept new connections, and so, temporally, the node bars access to itself. A legitimate RAN node/cell may determine and broadcast selection/re-selection barring criteria or access barring criteria corresponding to another cell/node that is believed to be an active FBS. An idle mode user equipment device may check satisfaction of configured FBS barring configuration criteria with respect to signals received from a targeted node to be selected or accessed. If the criterion/criteria are satisfied, the targeted RAN node may be effectively and dynamically barred from selection/re-selection or access.

Ensemble Scoring Model

Figure 2B:
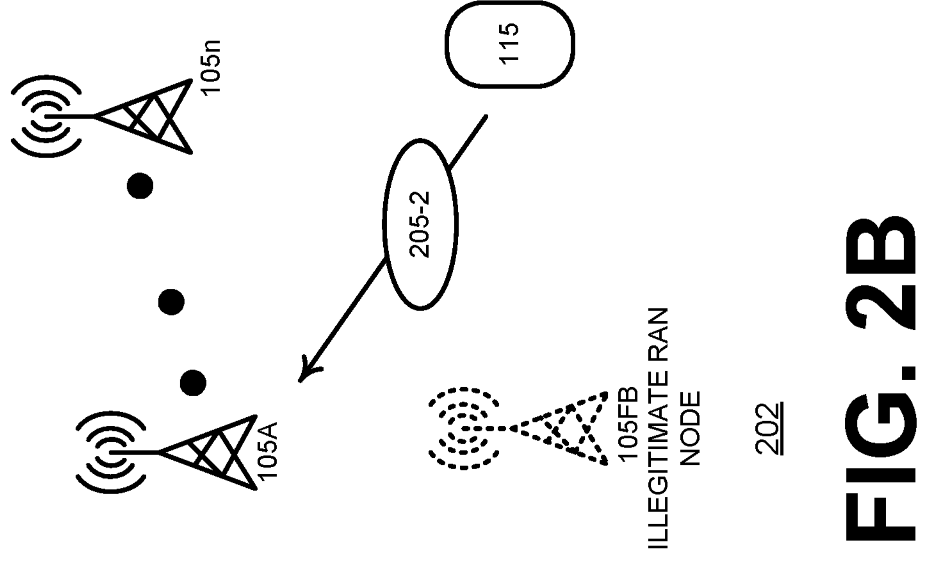
FIG. 2B illustrates an environment wherein an idle user equipment transmits a user equipment radio parameter measurement report to a legitimate base station while a fake base station is inactive.
Figure 2A:
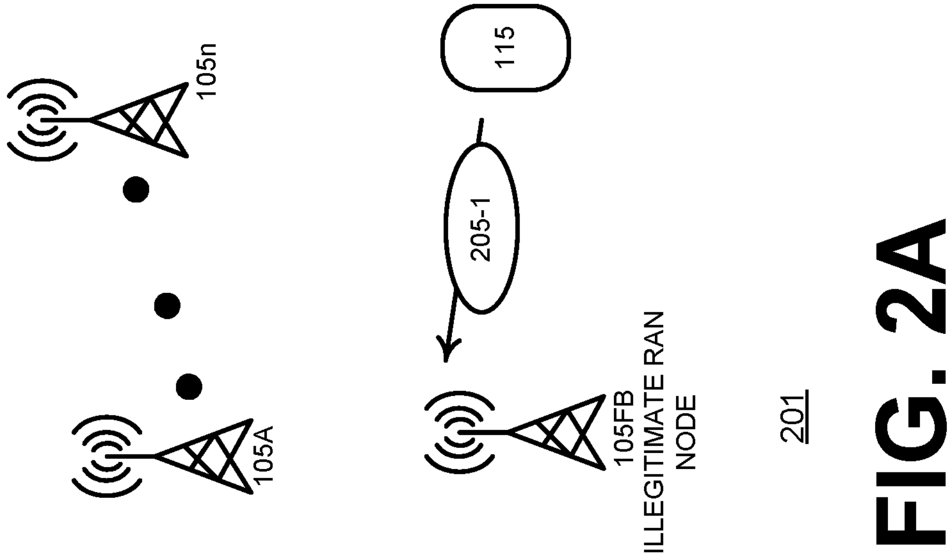
FIG. 2A illustrates an environment wherein an idle user equipment transmits a user equipment radio parameter measurement report to a fake base station.

Turning now to FIG. 2A, legitimate RAN nodes 105A . . . 105*n* may be located in a geographic vicinity of a fake base station 105FB such that user equipment 115 can camp on, or connect to, one or more of the legitimate RAN nodes. While idle, UE 115 may transmit, to fake base station 105FB, user equipment radio parameter measurement report 205-1, which may comprise radio performance parameters as determined by the UE, such as, for example, a received signal strength indication (e.g., RSRP) or a signal-to-interference-plus-noise-ratio value (e.g., "SINR"), and a timestamp associated with the report.

As shown in FIG. 2B, fake base station 105FB appears inactive to user equipment 115. The inactivity of fake base station 105 FB may be due to the fake base station being turned off, due to the fake base station changing a frequency, due to the fake base station leaving the vicinity of legitimate base stations 105A . . . 105*n*, or due to other detection evasion measures that may be performed by the fake base station to evade detection. Accordingly, user equipment 115 may transmit user equipment radio parameter measurement report 205-2 to legitimate base station 105A. Report 205-2 may comprise similar information to report 205-1, but with radio performance parameter values, measured by user equipment 115, corresponding to radio access network node 105A instead of corresponding to fake base station 105 FB and with a time stamp that corresponds to report 205-2.

Figure 2D:
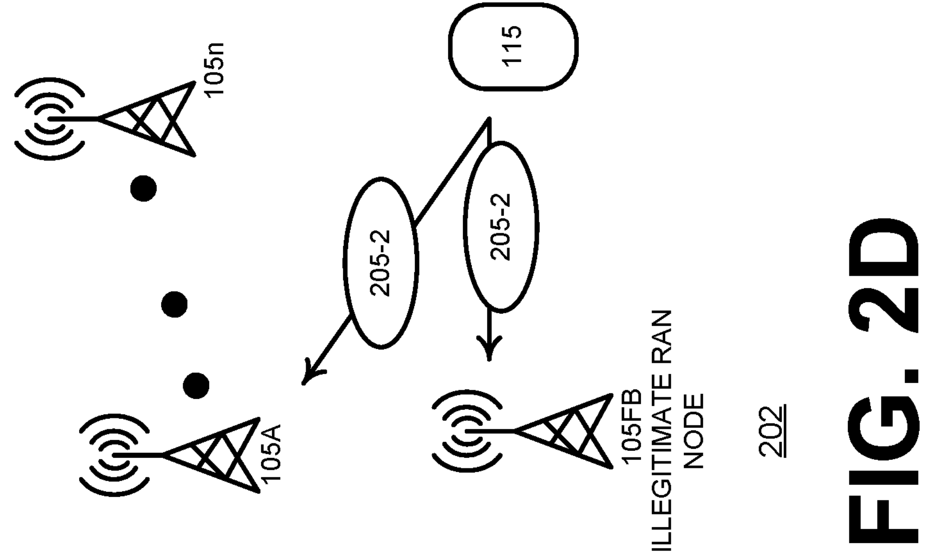
FIG. 2D illustrates an environment wherein a connected user equipment transmits a user equipment radio parameter measurement report to a fake base station and to a legitimate base station during handover from the fake base station to the legitimate base station.
Figure 2C:
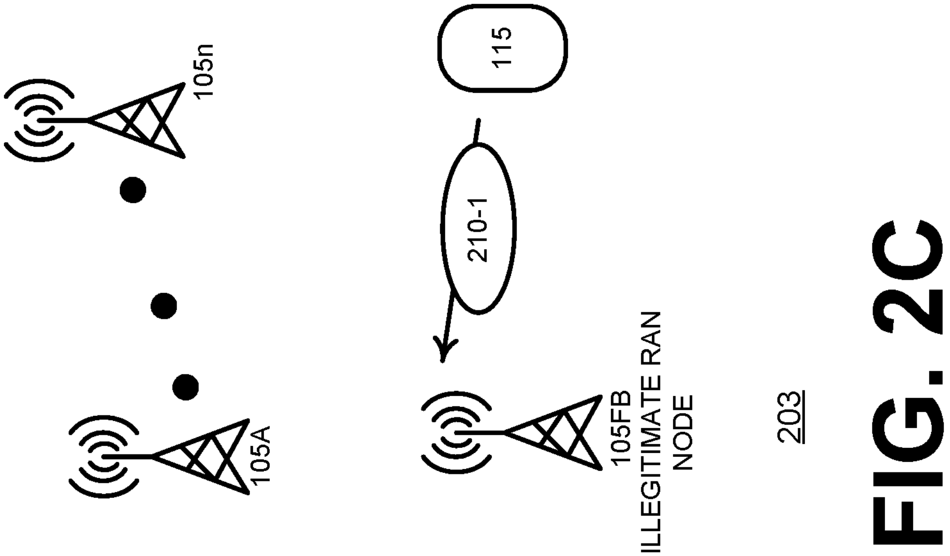
FIG. 2C illustrates an environment wherein a connected user equipment transmits a user equipment radio parameter measurement report to a fake base station.

As shown in FIG. 2C, user equipment 115 may transmit a user equipment radio parameter measurement value report 210-1 to illegitimate radio access network node 105 FB. A core network computing equipment component may not receive report 210-1 since node 105 FB is not a legitimate base station. In FIG. 2D, user equipment 115 is shown being handed over from illegitimate radio access network node 105 FB to legitimate radio access network node 105A. At a different time than report 210-1 was transmitted by user equipment 115 to illegitimate radio access network node 105 FB as shown in FIG. 2C, as shown in FIG. 2D user equipment 115 transmits user equipment radio parameter measurement report 210-2 to not only illegitimate radio access network node 105 FB but also to legitimate radio access network node 105A. Thus, because legitimate radio access network node 105A may be connected to a core network computing equipment component that may be part of a core network, for example core network 130 shown in FIG. 1, the network computing equipment may receive, or have access to, information corresponding to node 105A, including radio parameter measurement values and a timestamp corresponding to report 205-2. Accordingly, the network computing equipment may use radio performance measurement values and the timestamp included in report 205-2 to perform analysis, according to embodiments disclosed herein, with respect to illegitimate radio access network node 105FB and one or more legitimate radio access network nodes 105A . . . 105*n*.

Figure 3:
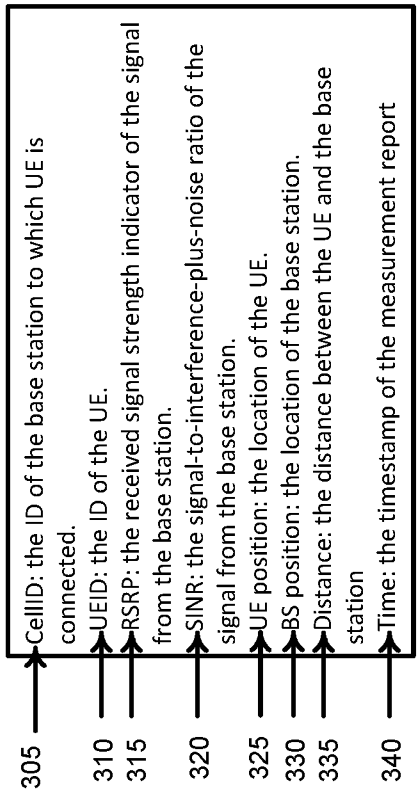
FIG. 3 illustrates example user equipment radio parameter measurement report information.

Turning now to FIG. 3, the figure illustrates example information of user equipment radio parameter measurement report 205 transmitted as shown in FIGS. 2A and 2B. It will be appreciated that a report 210, transmitted during handover of a user equipment from a first base station to a second base station, as shown in FIGS. 2C and 2D, may comprise similar information as report 205. Report 205 may comprise a radio access network node identifier 305 corresponding to a radio access network node to which report 205 was transmitted by user equipment. Report 205 may comprise a user equipment identifier 310 corresponding to a user equipment that transmitted report 205. Report 205 may comprise an RSRP value 315 that may correspond to a signal strength, determined by the user equipment identified by identifier 310, associated with a signal received by the user equipment from the radio access network node identified by identifier 305. Report 205 may comprise an SINR value 320 that may correspond to interference, determined by the user equipment identified by identifier 310, associated with reception of a signal transmitted by the radio access network node identified by identifier 305. Report 205 may comprise user equipment location information 325, for example GPS coordinates or location information determined by a wireless communication network within which the user equipment is operating, corresponding to a location of the user equipment when the user equipment generated report 205. Report 205 may comprise base station location information 330, which may correspond to a location of the radio access network node identified buy identifier 305. Report 205 may comprise distance information 335 indicative of distance between the user equipment identified by identifier 310 and the radio access network node identified by identifier 305 when the user equipment generated report 205. Report 205 may comprise time-related information, for example a timestamp, corresponding to a time when the user equipment identified by identifier 310 generated, or transmitted, report 205. Timestamp 340 may be usable by a network computing equipment component according to embodiments described herein in performing temporal analysis or in generating a temporal graph.

Figure 4:
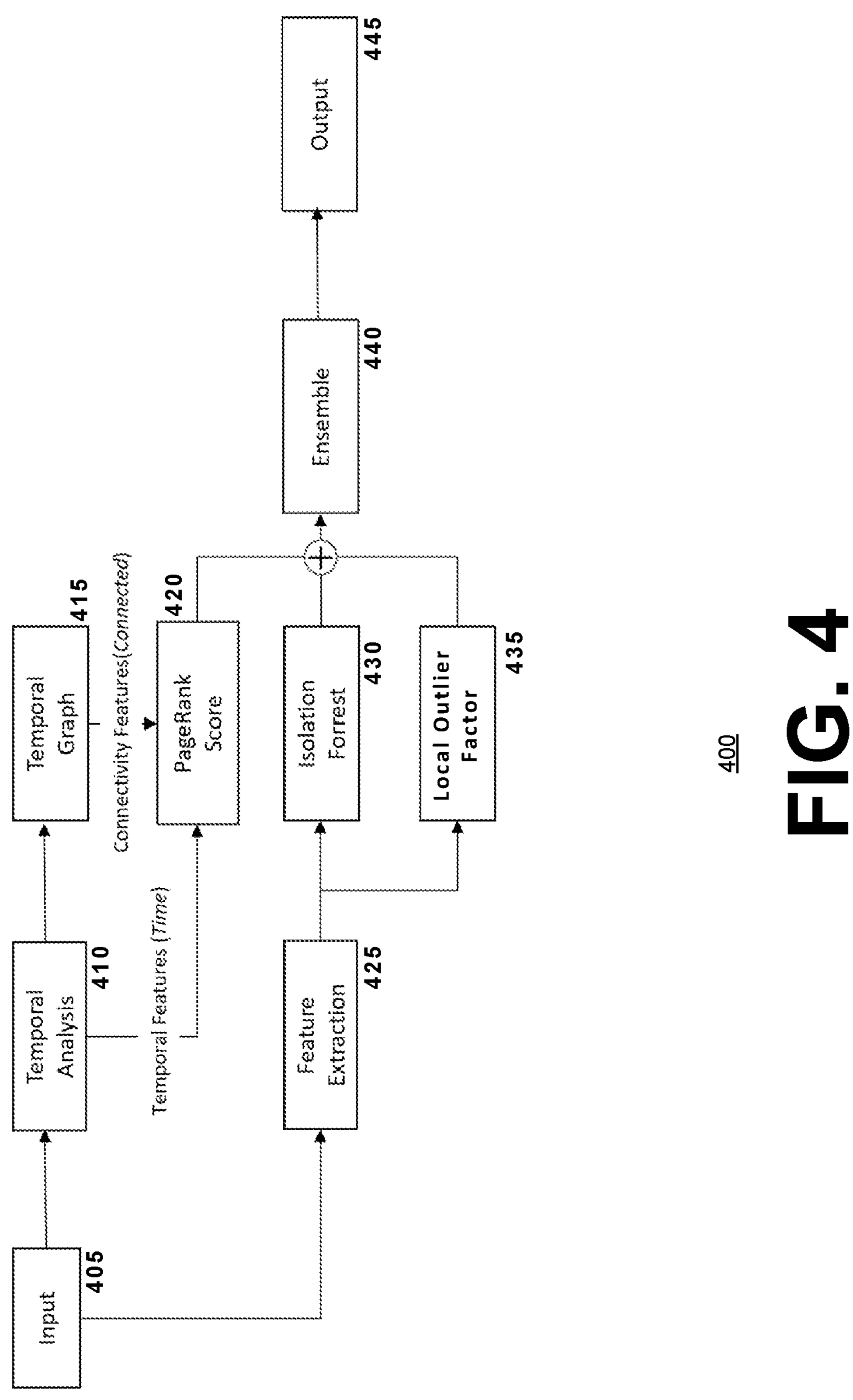
FIG. 4 illustrates an example learning model architecture for determining a probability that a radio access network node is a fake base station.

Turning now to FIG. 4, the figure illustrates an example learning model architecture 400 for determining a probability that a radio access network node is a fake base station. Temporal analysis module 410 may determine a mean of time differences, or intervals, between times corresponding to multiple user equipment radio parameter measurement reports 205 or 210. Temporal analysis module 410 may determine a standard deviation with respect to multiple radio parameter measurement reports 205 or 210. Temporal graph module 415 may determine a set of nodes that correspond to multiple radio access network nodes, with respect to which network computing equipment may analyze one or more radio parameter measurement reports 205 or 210. Temporal graph module 415 may determine a set of edges corresponding to the nodes of the graph. Pagerank score module 420 may determine a rank of edges determined by temporal graph module 415. Feature extraction module 425 may retrieve from a user equipment radio parameter measurement report 205 or 210 radio features, or radio parameter values, for example a signal strength value such as a RSRP value or a signal strength ratio value such as and as an SINR value. Feature extraction 425 may forward radio parameter values extracted from a user equipment radio parameter measurement report to one or more anomaly determination modules, for example isolation forest model module 430 or local outlier features model module 435.

Isolation forest model module 430 may facilitate detection of anomalies in radio signals parameter value such as RSRP and SINR. Isolation forest model module 430 may facilitate isolating rare and abnormal data points within a dataset, such as a dataset comprising radio parameter values extracted by features extraction module 425, thus facilitating identifying unusual signal strengths or interferences levels that may correspond to network anomalies or security breaches.

Local outlier factor model module 435 may facilitate evaluation of local density deviations of data points within a dataset. Local outlier factor model module may facilitate detecting anomalies in complex, high-dimensional datasets, thus facilitating identifying unusual patterns or outliers in wireless communication parameter data sets. With respect to radio features extracted by feature extraction module 425, local outlier features model module may facilitate determining a density of measured radio parameter values within in a data set of measured parameter values using information (including location information as well as radio parameter values) extracted from one or more user equipment radio parameter measurement reports. It will be appreciated that in describing an anomaly detection learning mode, the term 'density' may refer to a 'density" within a clustered region (with k nearest cluster). Accordingly, local outlier features model module can facilitate determination of regions corresponding to signal strengths or interference levels.

Ensemble model module 440 may combine outputs of module 420, module 430, and module 435 to result in an output 445, which may comprise or which may be referred to as a combined score, or a combined anomaly score. The combined anomaly score may be analyzed with respect to an anomaly score criterion to result in an analyzed anomaly score, and based on satisfaction of the anomaly score criterion by the analyzed anomaly score, a network computing equipment may perform a connection establishment action, for example adding a radio access network node identifier corresponding to the analyzed anomaly score to a barred base station list or a barred base station configuration.

Figure 5:
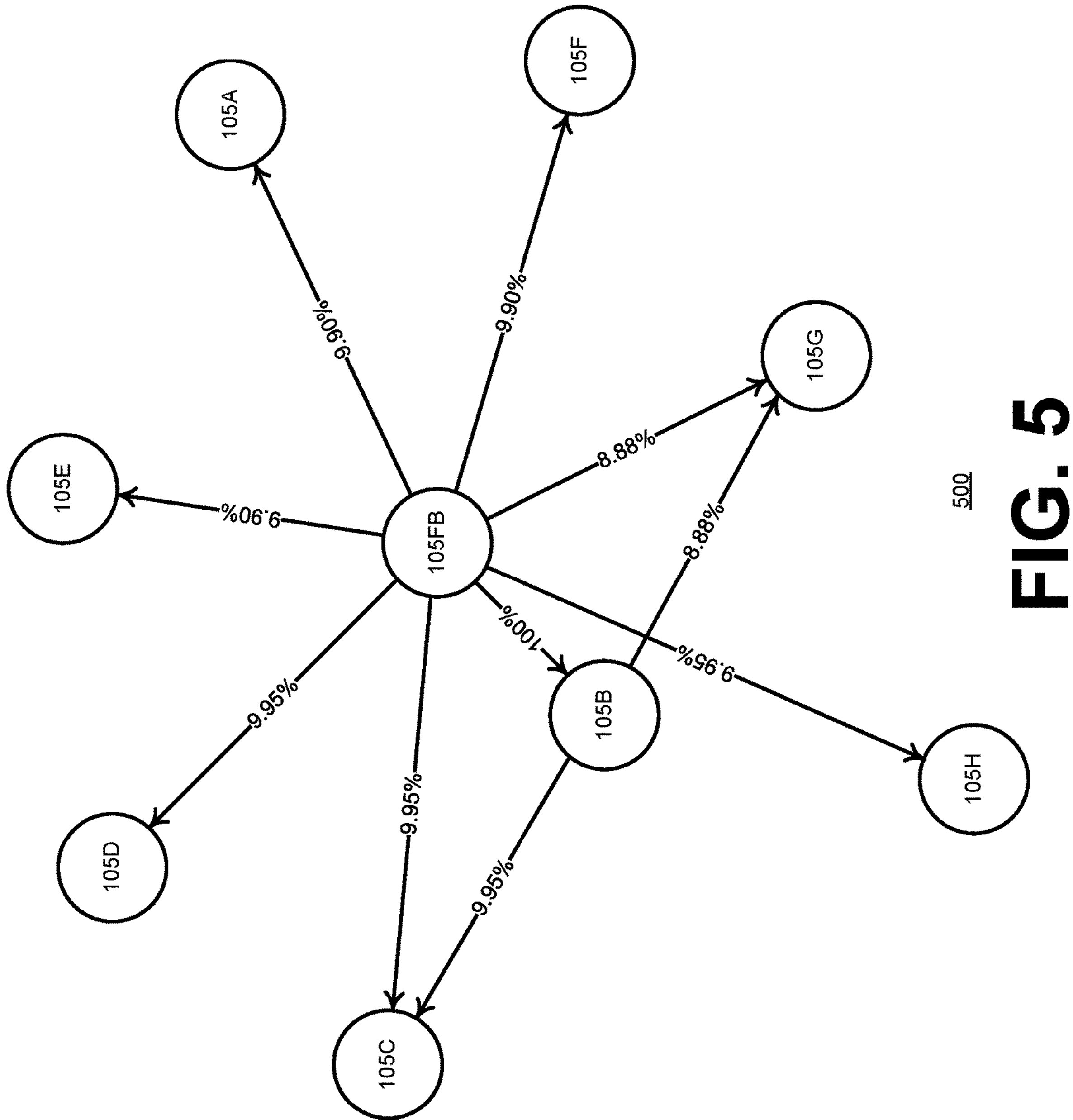
FIG. 5 illustrates an example temporal graph with nodes representing multiple legitimate radio access network nodes connected to a node representing a fake base station by graph edges representing connection transition values corresponding to connection transitions associated with user equipment with respect to nodes connected by the edges.

FIG. 5 illustrates an example temporal graph 500 with nodes representing multiple legitimate radio access network nodes 105A-105H and a fake base station 105FB. Graph edges between nodes 105 represent connection transition values corresponding to connection transitions associated with user equipment with respect to nodes connected by the edges. For example, a connection transition may correspond to one or more user equipment selecting a legitimate node 105A-105H to camp on instead of camping on fake base station 105FB. In another example, a connection transition may correspond to one or more user equipment being handed over from fake base station 105FB to a legitimate base station 105A-105H. Although a network computing equipment, for example a component of core network 130 shown in FIG. 1, may not receive user equipment radio parameter measurement reports directed from a user equipment to fake base station 105FB, the network computing equipment may receive a user equipment radio parameter measurement report corresponding to a user equipment selecting a legitimate base station 105A-105H or corresponding to a handover of a user equipment from the fake base station to a legitimate base station. A legitimate base station may receive a user equipment radio parameter measurement remote report from a user equipment when the user equipment selects the legitimate base station or when the user equipment is handed over to the legitimate base station.

Temporal graph module 415, as shown in FIG. 4, may generate graph 500 shown in FIG. 5, and pagerank score module 420 may determine edge values of graph 500 based on a time-related value associated with one or more user equipment selecting or being handed over to a legitimate base station 105A-105H from fake base station 105FB. Arrows in graph 500 may be indicative of transition from fake base station 105FB to a legitimate base station 105A-105H. The edge values, shown in graph 500 as percent values, may correspond to a probability during a given sampling period, which may be a configured period, that a user equipment transitions from fake base station 105 FB to a legitimate base station 105A-105H. The edge probabilities shown in graph 500 may be determined based on time-related values, for example timestamps in user equipment radio parameter measurement reports that were transmitted by one or more user equipment during a configured sampling period.

In an example, a number of handovers during a configured period, as indicated by time stamps associated with user equipment radio parameter measurement reports transmitted by one or more user equipment during the configured period, corresponding to handovers between base station 105FB to base station 105B may result in a 100% edge probability while probabilities corresponding to handovers to other base stations 105A and 105C-105H may be less than 10%, including probabilities corresponding to handovers from base station 105B to base stations 105C and from base station 105B to base station 105G. Edge probabilities shown in graph 500 may be determined by pagerank model module 420 shown in FIG. 4 and may be provided to ensemble model module 440. Thus, edge probabilities shown in graph 500 illustrated in FIG. 5 may be combined with anomaly scores generated by isolation forest module 430 and local outlier features module 435 by ensemble learning model module 440 shown in FIG. 4 to result in a combined anomaly score that may be indicative of a probability that a radio access network node is a fake base station. It will be appreciated that a high edge probability corresponding to connection action with respect to a given base station, for example selection of the given base station or hand over to the given base station, may be deemed by ensemble model module 440 shown in FIG. 4 not to correspond to a fake base station if isolation forest model module 430 or local outlier features model module 435 indicate nonanomalous radio parameter measurements corresponding to the given base station. However, ensemble model module 440 may determine a given base station as a fake base station if the base station corresponds to a determination of a high edge probability in a temporal graph, for example graph 500 shown in FIG. 5, even if isolation forest model module 430 shown in FIG. 4 and local outlier features model module 435 indicate nonanomalous radio parameter measurements corresponding to the given base station. Ensemble model module 440 may respectively apply different weighting values to outputs of modules 420, 430, and 435. The different weighting values applicable to outputs of modules 420, 430, and 435 may be configured manually into ensemble module 440 or may be determined by training or via machine learning.

A combined anomaly score may be normalized to a range between 0 and 1 and may be assigned as a fake base station score to a radio access network node identifier to which the combined anomaly score corresponds. Combined anomaly scores may be grouped according to radio access network node identifiers. Based on grouping of combined anomaly scores with respect to radio access network node identifiers, mean fake base station probabilities may be determined, which may be complied in a list of radio access node identifiers to result in a list of radio access node identifiers and associated probabilities of respective radio access noted identifiers corresponding to fake base stations.

Turning now to FIG. 6, the figure illustrates a flow diagram of an example method to determine a probability that a radio access network node is a fake base station. Method 600 begins at act 605. At act 610, one or more user equipment may measure radio parameters and transmit measured radio parameter values in a user equipment radio parameter measurement report. Measured radio parameter values may comprise RSRP or SINR values. A user equipment radio parameter measurement report may comprise a timestamp corresponding to the report. At act 615, network computing equipment may receive one or more user equipment radio parameter measurement report(s) corresponding to a configured measurement/sample period. The configured period may be configured to facilitate determining, based on information contained in the one or more user equipment radio parameter measurement report(s), whether a radio access network node that may be indicated in the reports received at act 615 is likely to be a fake base station.

At act 620, the network computing equipment may analyze information contained in the one or more user equipment radio parameter measurement report(s) with respect to a time value or other time information corresponding to, or based on, a time indicated in each of the one or more user equipment radio parameter measurement report(s). At act 625, the network computing equipment may generate a temporal graph based on time information analyzed at act 620. Edges of the temporal graph may be indicative of, or may correspond to, connection activity, for example selection/reselection or handover, corresponding to a user equipment that transmitted one of the one or more user equipment radio parameter measurement reports at 620 with respect to one or more radio access network nodes indicated in the one or more user equipment radio parameter measurement reports. At act 630, the network computing equipment may apply a pagerank model to values corresponding to the temporal graph edges determined at act 625 to result in one or more connection transition values. For example, an edge corresponding to more connection transition activity (e.g., more selection/reselection or handover) during the configured period, to which the one or more user equipment radio parameter measurement reports analyzed at act 620 correspond, may result in a higher corresponding rank, or score, generated by the pagerank model at act 630.

At act 635, the network computing equipment may apply one or more anomaly detection learning models, for example, one or more of an isolation forest model or a local outlier feature model, to radio parameter measured values received in the one or more user equipment radio parameter measurement reports at act 615. The one or more anomaly detection learning models may provide as outputs one or more anomaly scores corresponding to one or more radio access network nodes indicated in the one or more user equipment radio parameter measurement reports received at act 615. It will be appreciated that the applying of the one or more anomaly detection learning models at act 635 may be optional and is therefore enclosed with dashed lines in FIG. 6.

At act 640, anomaly scores generated at act 635, or a connection transition value determined that 630, may be combined into a combined anomaly score by an ensemble learning model. At act 645, the combined anomaly score may be analyzed with respect to an anomaly score criterion, which may be referred to as a fake base station criterion, to result in an analyzed combined anomaly score. At 650, a determination is made whether the analyzed combined anomaly score satisfies the anomaly score criterion. If a determination is made at act 650 that the analyzed combined anomaly score does not satisfy the anomaly score criterion, method 600 may return to act 610 and user equipment may continue to generate user equipment radio parameter measurement reports and method 600 may continue as previously described.

If a determination is made at act 650 that the analyzed combined anomaly score satisfies the anomaly score criterion, method 600 may advance to act 655. At act 655, a connection establishment action may be performed. A connection establishment action performed at act 655 may comprise adding to a barred base station list an identifier corresponding to a radio access network node that has been determined to be a fake base station based on an analyzed combined anomaly score being determined at act 650 to satisfy the anomaly score criterion. After performance of the connection establishment action at act 655, method 600 advances to act 660 and ends.

Turning now to FIG. 7, the figure illustrates an example embodiment method 700 comprising at block 705 receiving, by network computing equipment comprising a processor, at least one user equipment radio parameter measurement report, generated by at least one user equipment, comprising at least one report value; at block 710 analyzing, by the network computing equipment, the at least one report value to result in at least one analyzed report value; and at block 715 based on the at least one analyzed report value, determining, by the network computing equipment, at least one connection transition value with respect to at least one radio access network node.

Turning now to FIG. 8, the figure illustrates a network computing equipment 800, comprising at block 805 a processor configured to process executable instructions that, when executed by the processor, facilitate performance of operations, comprising receiving at least one user equipment radio parameter measurement report, corresponding to at least one radio access network node and generated by at least one user equipment, the at least one user equipment radio parameter measurement report comprising at least one time value and at least one radio performance measurement value; at block 810 analyzing the at least one time value to result in at least one first anomaly value corresponding to the at least one radio access network node; at block 815 analyzing the at least one radio performance measurement value to result in at least one second anomaly value corresponding to the at least one radio access network node; at block 820 based on the at least one first anomaly value and the at least one second anomaly value, determining at least one combined anomaly score; 825 analyzing the at least one combined anomaly score with respect to an anomaly score criterion to result in an analyzed anomaly score; and at block 830 based on satisfaction of the anomaly score criterion, performing a connection establishment action.

Turning now to FIG. 9, the figure illustrates a non-transitory machine-readable medium 900 comprising at block 905 executable instructions that, when executed by a processor of a network computing equipment, facilitate performance of operations, comprising receiving at least one user equipment radio parameter measurement report, corresponding to at least one radio access network node and generated by at least one user equipment, the at least one user equipment radio parameter measurement report comprising at least one time value and at least one radio performance measurement value; at block 910 analyzing the at least one time value to result in at least one first anomaly value corresponding to the at least one radio access network node; at block 915 analyzing the at least one radio performance measurement value to result in at least one second anomaly value corresponding to the at least one radio access network node; and at block 920 based on the at least one first anomaly value and the at least one second anomaly value, determining at least one combined anomaly score indicative of a probability that the at least one radio access network node is a fake base station.

Figure 10:
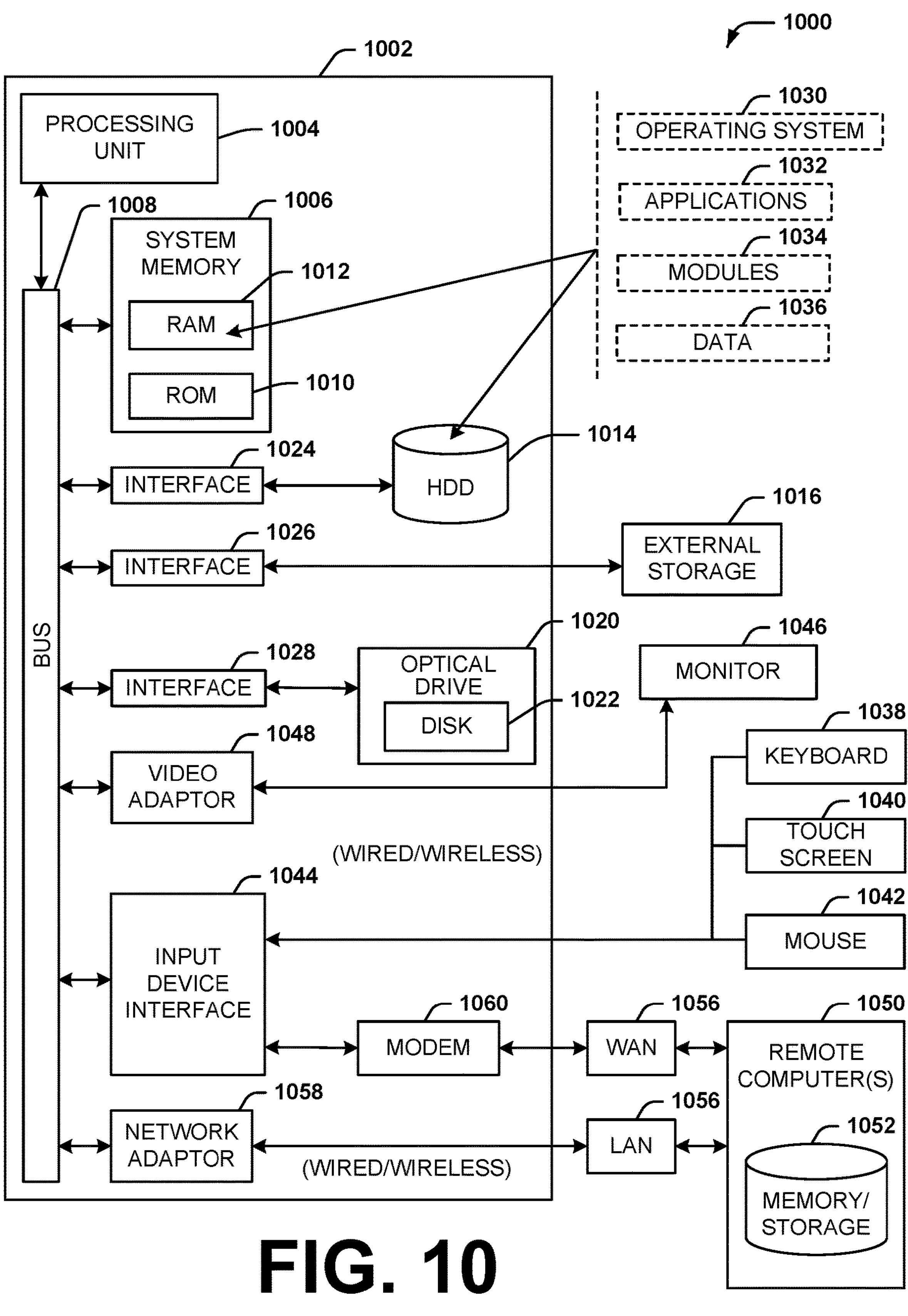
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
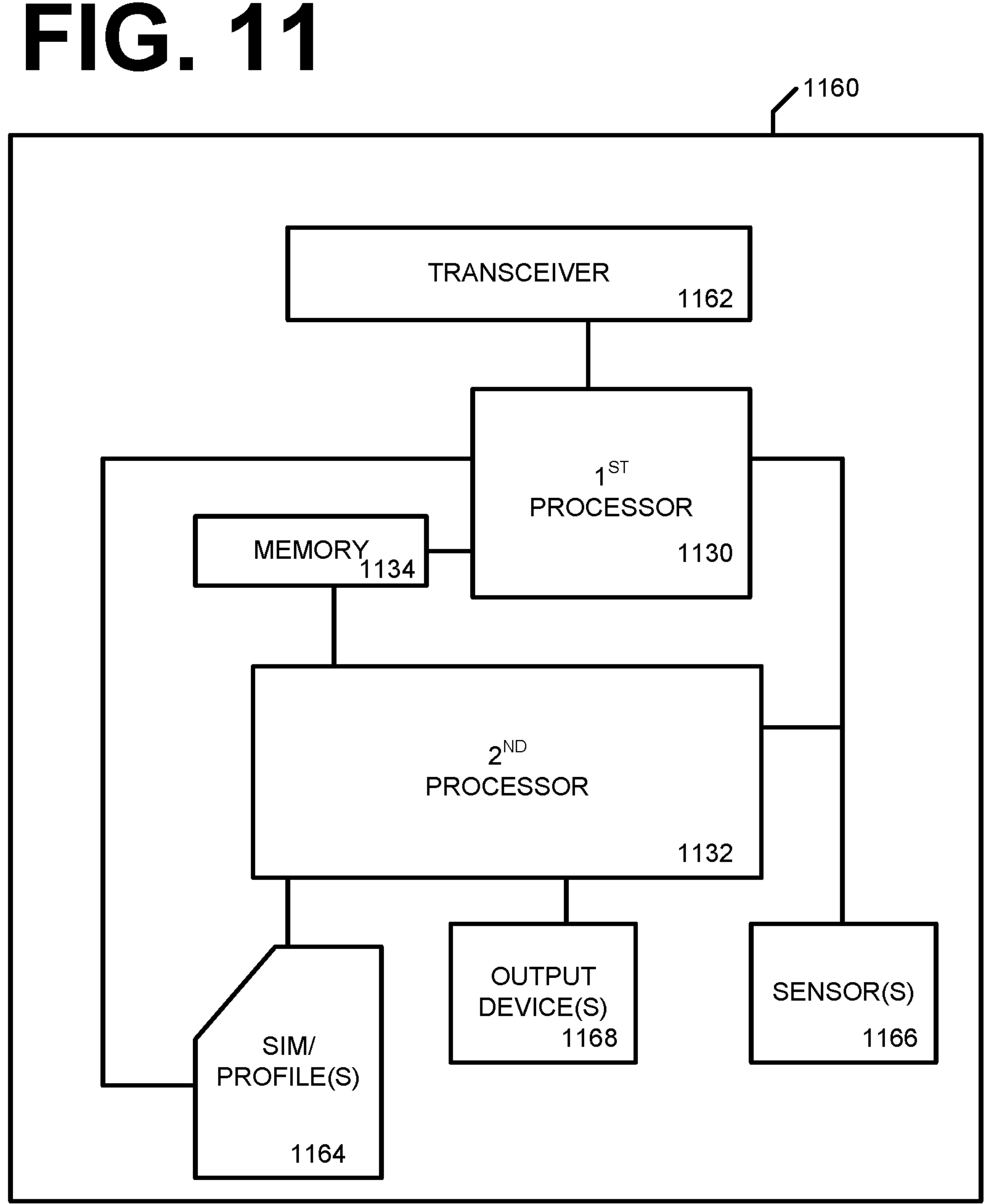
FIG. 11 illustrates a block diagram of an example wireless user equipment.

Turning to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, a tracking device, remote sensing devices, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 1134 or a separate memory portion), for facilitating wireless communication with RAN 105 or core network 130 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 1130 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or a baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/in a low power state when UE 1160 does not need it for executing applications and processing data related to an application provides an advantage of reducing power consumption when the UE only needs to use the first processor portion 1130 while in listening mode for monitoring routine configured bearer management and mobility management/maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, which are external to UE 1160.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by network computing equipment comprising at least one processor, at least one user equipment radio parameter measurement report, generated by at least one user equipment, comprising at least one report value;

analyzing, by the network computing equipment, the at least one report value to result in at least one analyzed report value;

based on the at least one analyzed report value, determining, by the network computing equipment, at least one connection transition value with respect to at least one radio access network node, wherein the at least one connection transition value is a first connection transition value corresponding to a time associated with the at least one user equipment radio parameter measurement report, wherein the at least one user equipment radio parameter measurement report further comprises at least one radio performance measurement value, and wherein the method further comprises:

analyzing, by the network computing equipment, the at least one radio performance measurement value to result in a second connection transition value associated with the at least one radio access network node; and based on the first connection transition value and the second connection transition value, determining, by the network computing equipment, a fake base station score indicative of a probability that the at least one radio access network node is a fake base station.

2. The method of claim 1, wherein the at least one analyzed report value corresponds to at least one interval associated with the at least one user equipment radio parameter measurement report.

3. The method of claim 1, wherein the at least one analyzed report value is at least one time-based value.

4. The method of claim 1, wherein the at least one radio access network node is a first radio access network node, wherein the at least one connection transition value is a first connection transition value that corresponds to the at least one user equipment transitioning from having a connection status with the first radio access network node to having the connection status with a second radio access network node, wherein the at least one user equipment radio parameter measurement report is a first user equipment radio parameter measurement report, wherein the at least one report value is a first time corresponding to the at least one user equipment radio parameter measurement report, and wherein the first connection transition value is determined based on at least the first time and a second time corresponding to a second user equipment radio parameter measurement report.

5. The method of claim 4, further comprising:

determining, by the network computing equipment, a second connection transition value based on at least the first connection transition value and a third time corresponding to a third user equipment radio parameter measurement report.

6. The method of claim 1, wherein the at least one radio access network node is a first radio access network node, and wherein the at least one connection transition value corresponds to the at least one user equipment being idle and transitioning from selection of camping on the first radio access network node to selection of camping on a second radio access network node.

7. The method of claim 1, wherein the at least one radio access network node is a first radio access network node, and wherein the at least one connection transition value corresponds to the at least one user equipment transitioning from being connected to the first radio access network node to being connected to a second radio access network node.

8. The method of claim 1, further comprising:

analyzing, by the network computing equipment, the fake base station score with respect to a fake base station score criterion to result in an analyzed fake base station score;

based on the analyzed fake base station score being determined to satisfy the fake base station score criterion, determining, by the network computing equipment, that the at least one radio access network node is at least one fake base station; and performing, by the network computing equipment, a connection establishment action.

9. The method of claim 8, wherein the connection establishment action comprises adding at least one identifier corresponding to the at least one fake base station to a base station barring list.

10. The method of claim 1 wherein the analyzing of the at least one radio performance measurement value comprises analyzing the at least one radio performance measurement value according to at least one of: an isolation forest machine learning model or a local outlier feature machine learning model.

11. The method of claim 1, wherein the at least one radio performance measurement value is at least one of: a received signal strength value or a received signal signal-to-interference-plus-noise ratio value.

12. The method of claim 1, wherein the at least one connection transition value corresponds to a temporal graph edge.

13. The method of claim 1, further comprising:

adding at least one identifier corresponding to the at least one radio access network node to at least one base station barring list.

14. Network computing equipment, comprising:

at least one processor configured to process executable instructions that, when executed by the at least one processor, facilitate performance of operations, comprising:

receiving at least one user equipment radio parameter measurement report, corresponding to at least one radio access network node and generated by at least one user equipment, the at least one user equipment radio parameter measurement report comprising at least one time value and at least one radio performance measurement value;

analyzing the at least one time value to result in at least one first anomaly value corresponding to the at least one radio access network node;

analyzing the at least one radio performance measurement value to result in at least one second anomaly value corresponding to the at least one radio access network node;

based on the at least one first anomaly value and the at least one second anomaly value, determining at least one combined anomaly score;

analyzing the at least one combined anomaly score with respect to an anomaly score criterion to result in an analyzed anomaly score; and based on satisfaction of the anomaly score criterion, performing a connection establishment action, wherein the analyzed anomaly score is indicative of a probability that the at least one radio access network node is a fake base station and wherein the performing the connection establishment action comprises, wherein the analyzing of the at least one time value comprises applying a temporal graph model to the at least one time value, wherein the at least one first anomaly value corresponds to at least one edge of a temporal graph generated by the applying of the temporal graph model to the at least one time value, wherein the at least one radio access network node is a first radio access network node, and wherein the at least one edge corresponds to connection transition activity with respect to the first radio access network node and at least a second radio access network node.

15. The network computing equipment of claim 14, wherein the determining of the at least one combined anomaly score comprises applying an ensemble learning model to the at least one first anomaly value and the at least one second anomaly value.

16. The network computing equipment of claim 14, wherein the analyzing of the at least one radio performance measurement value comprises applying, to the at least one radio performance measurement value, at least one of: an isolation forest learning model or a local outlier factor learning model.

17. The network computing equipment of claim 14, wherein the network computing equipment is part of a wireless communication network core network.

18. The network computing equipment of claim 14, wherein the connection establishment action comprises adding at least one identifier corresponding to the at least one radio access network node to at least one base station barring list.

19. A non-transitory machine-readable medium, comprising executable instructions that, when executed by at least one processor of network computing equipment, facilitate performance of operations, comprising:

receiving at least one user equipment radio parameter measurement report, corresponding to at least one radio access network node and generated by at least one user equipment, the at least one user equipment radio parameter measurement report comprising at least one time value and at least one radio performance measurement value;

analyzing the at least one time value to result in at least one first anomaly value corresponding to the at least one radio access network node;

analyzing the at least one radio performance measurement value to result in at least one second anomaly value corresponding to the at least one radio access network node; and based on the at least one first anomaly value and the at least one second anomaly value, determining at least one combined anomaly score indicative of a probability that the at least one radio access network node is a fake base station, wherein the analyzing of the at least one time value comprises applying a temporal graph model to the at least one time value, wherein the at least one first anomaly value corresponds to at least one edge of a temporal graph generated by the applying of the temporal graph model to the at least one time value, wherein the at least one radio access network node is a first radio access network node, and wherein the at least one edge corresponds to connection transition activity with respect to the first radio access network node and at least a second radio access network node.

20. The non-transitory machine-readable medium of claim 19, wherein the operations further comprise:

adding at least one identifier corresponding to the at least one radio access network node to at least one base station barring list.

* * * * *